(12) United States Patent
Jochumsen et al.

(10) Patent No.: US 8,534,326 B2
(45) Date of Patent: Sep. 17, 2013

(54) METERING PUMP ASSEMBLY

(75) Inventors: Hans Henrik Jochumsen, Allerød (DK); Niels Stubager Kiemer, Veksø (DK); Karim Lindberg, Veksø (DK); Niels Torp Madsen, Birkerød (DK); Tom Johansen, Helsingborg (SE)

(73) Assignee: Grundfos NoNox a/s, Bjerringbro (DK)

( * ) Notice: Subject to any disclaimer, the term of this patent is extended or adjusted under 35 U.S.C. 154(b) by 1099 days.

(21) Appl. No.: 11/813,172

(22) PCT Filed: Dec. 29, 2005

(86) PCT No.: PCT/EP2005/014113
§ 371 (c)(1),
(2), (4) Date: Jun. 29, 2007

(87) PCT Pub. No.: WO2006/072445
PCT Pub. Date: Jul. 13, 2006

(65) Prior Publication Data
US 2009/0028729 A1 Jan. 29, 2009

(30) Foreign Application Priority Data
Dec. 30, 2004 (EP) .................................. 04030995

(51) Int. Cl.
*F04B 13/00* (2006.01)
(52) U.S. Cl.
USPC ............ 137/896; 137/606; 137/541; 137/895
(58) Field of Classification Search
USPC ................. 137/606, 541, 895, 896, 897, 853; 60/295
See application file for complete search history.

(56) References Cited

U.S. PATENT DOCUMENTS

| 1,212,806 | A | * | 1/1917 | Newton | 137/606 |
|---|---|---|---|---|---|
| 1,921,895 | A | * | 8/1933 | Taurisano | 137/606 |
| 2,655,178 | A | * | 10/1953 | Sarosdy | 137/853 |
| 3,693,656 | A | * | 9/1972 | Sauer | 137/896 |
| 4,938,254 | A | * | 7/1990 | Gimby | 137/541 |
| 5,645,804 | A | | 7/1997 | Sumiya et al. | |
| 5,884,475 | A | | 3/1999 | Hofmann et al. | |
| 6,050,088 | A | | 4/2000 | Brenner | |
| 6,187,182 | B1 | * | 2/2001 | Reynolds et al. | 137/541 |

(Continued)

FOREIGN PATENT DOCUMENTS

| DE | 19946902 A1 | 4/2001 |
|---|---|---|
| DE | 19947197 A1 | 4/2001 |

(Continued)

OTHER PUBLICATIONS

Jochumsen et al.; U.S. Appl. No. 11/813,171, filed Jun. 29, 2007; Dosing Pump Unit.

(Continued)

*Primary Examiner* — Kevin Lee
(74) *Attorney, Agent, or Firm* — Panitch Schwarze Belisario & Nadel LLP

(57) ABSTRACT

The invention relates to a metering pump for admixing a fluid reduction agent into an exhaust gas flow, which comprises a premixing device in which the supplied reduction agent is mixed in a mixing region with a pressurized gas, wherein a first return valve is arranged in the premixing element in a supply conduit for the reduction agent, in front of the mixing region in the flow direction.

15 Claims, 5 Drawing Sheets

(56) References Cited

U.S. PATENT DOCUMENTS

| | | |
|---|---|---|
| 6,192,677 B1 | 2/2001 | Tost |
| 6,220,296 B1 | 4/2001 | Ragsdale et al. |
| 6,273,120 B1 | 8/2001 | Hoffman et al. |
| 6,470,673 B1 | 10/2002 | van Nieuwstadt et al. |
| 6,814,303 B2 | 11/2004 | Edgar et al. |
| 6,848,251 B2 | 2/2005 | Ripper et al. |
| 7,017,335 B2 | 3/2006 | Huber et al. |
| 7,100,366 B2 | 9/2006 | Hager et al. |
| 7,467,749 B2 | 12/2008 | Tarabulski et al. |
| 7,481,049 B2 | 1/2009 | Huber et al. |
| 2003/0033799 A1 | 2/2003 | Scheying |
| 2003/0188783 A1* | 10/2003 | Vicars .......................... 137/541 |
| 2004/0060286 A1 | 4/2004 | Huber et al. |
| 2004/0083723 A1 | 5/2004 | Hager et al. |
| 2004/0115074 A1 | 6/2004 | Huber et al. |
| 2004/0177606 A1 | 9/2004 | Scharsack |

FOREIGN PATENT DOCUMENTS

| | | |
|---|---|---|
| DE | 10116214 A1 | 7/2007 |
| EP | 1435458 A1 | 7/2007 |
| KR | 10-2002-0033828 | 5/2002 |
| KR | 10-2002-0034199 | 5/2002 |
| KR | 10-2004-0030650 | 4/2004 |
| WO | 9011010 A1 | 10/1990 |
| WO | 00/79108 A1 | 12/2000 |
| WO | 0123715 A1 | 4/2001 |
| WO | 0125600 A1 | 4/2001 |
| WO | 02/25074 A1 | 3/2002 |
| WO | WO 02/27160 * | 4/2002 |
| WO | 02/101209 A1 | 12/2002 |

OTHER PUBLICATIONS

Jochumsen et al.; U.S. Appl. No. 11/813,233, filed Jul. 2, 2007; Metering Pump Assembly.
Office Action Issued Dec. 23, 2010 in U.S. Appl. No. 11/813,233.
Office Action issued Apr. 18, 2012 in U.S. Appl. No. 11/813,171.
Korean Office Action issued Jul. 31, 2008 in Korean Application Serial No. 10-2007-7014552.
Chinese Office Action Issued Aug. 22, 2008 in Chinese Application Serial No. 200580044933.X.
DE19946902 Translation—an automated translation of Bosch (DE19946902) provided by the EPO, Dec. 2, 2009.
International Search Report dated Apr. 3, 2006 in International Application No. PCT/EP2005/014111.
International Search Report dated Mar. 14, 2006 in International Application No. PCT/EP2005/014112.
US Office Action dated Nov. 9, 2009 in U.S. Appl. No. 11/813,233.
US Office Action dated Jun. 1, 2010 in U.S. Appl. No. 11/813,233.
US Office Action dated Dec. 28, 2009 in U.S. Appl. No. 11/813,171.
US Office Action dated Jul. 12, 2010 in U.S. Appl. No. 11/813,171.
Office Action dated Dec. 7, 2010 in U.S. Appl. No. 11/813,171, 12 pages.
Office Action issued Nov. 20, 2012 in U.S. Appl. No. 11/813,171.

* cited by examiner

METERING PUMP ASSEMBLY

CROSS-REFERENCE TO RELATED APPLICATIONS

This application is a Section 371 of International Application No. PCT/EP2005/014113, filed Dec. 29, 2005, which was published in the German language on Jul. 13, 2006, under International Publication No. 2006/072445 A1, the disclosure of which is incorporated herein by reference.

BACKGROUND OF THE INVENTION

The invention relates to a metering pump assembly for admixing a fluid reduction agent in an exhaust gas flow.

With auto-igniting internal combustion engines, nitrous oxides arise on operation with excess oxygen, which is the case in the majority of operating conditions, and specifically with direct injection into the main combustion space, as is typically the case with diesel motors. It is known to supply a reduction catalyser to the exhaust gas flow, in order to reduce these nitrous oxide emissions. Usually, an aqueous urea solution as a reduction agent is supplied to the exhaust gas in a finely distributed manner before entry into the catalyser. Thereby, the supplied urea quantity is to be matched as exactly as possible to the combustion process, in order to ensure an as complete as possible reduction within the catalyser, and on the other hand to avoid an excess of urea.

A special metering pump for metering and supplying the reduction agent to the exhaust gas flow is known from EP 1 435 458 A1. With this metering pump, the supplied reduction agent is mixed or subjected to pressurized air in the metering pump assembly before the supply to the exhaust gas flow. Because urea tends to crystallize in combination with air, it is important to flush the complete region which comes into contact with the air and urea, with air, before the stoppage of the installation, so that no urea remains in this region. For this, a 3/2-way valve is provided in the metering pump according to EP 1 435 458 A1, which in a first position leads urea into a conduit section which is connected to a pressurized air conduit for impinging the urea with pressurized air. In a second position, the 3/2-way valve is switched such that no urea gets into the mentioned conduit section, but pressurized air is supplied via a second entry of the 3/2-way valve, so that the conduit section in which the urea is subjected to pressurized air, is flushed out with pressurized air. In this manner, one may prevent a crystallization of the urea in the conduit section.

The construction of the metering pump assembly according to EP 1 435 458 A1 is quite complicated on account of the valve required for the flushing. Furthermore, the operation of the metering pump assembly is made more complicated, since the flushing of the installation part coming into contact with air and urea must be ensured every time when switching off. However, for reasons of cost and for reasons of operational reliability, it is desirable to simplify the construction and operation of the metering pump assembly.

BRIEF SUMMARY OF THE INVENTION

It is therefore the object of the invention to provide an improved metering pump assembly for admixing a fluid reduction agent into an exhaust gas flow, which is constructed in a simple and less expensive manner, and permits a more simple operation.

A metering pump assembly achieves this object with the features specified in claim 1. Preferred embodiments are to be deduced from the associated dependent claims, the subsequent description as well as the figures.

The metering pump assembly according to the invention which is provided for admixing a fluid reduction agent (e.g. urea) into an exhaust gas flow, comprises a premixing device in which, in a mixing region, the supplied reduction agent delivered by a metering pump is mixed with a pressurized gas. The metering pump delivers the reduction agent from a tank, wherein the metering pump delivers a controllable reduction agent quantity adapted to the momentary combustion process in the motor. For example, the metering pump may be designed as a membrane- or piston pump, wherein the delivered reduction agent quantity may be set by the number of pump strokes and/or the stroke speed. The premixing element is designed such that in a feed for the reduction agent, a first return valve is arranged in the flow direction in front of the actual mixing region. This return valve prevents pressurized gas and in particular pressurized air from being able to penetrate into the pressure conduit via which the reduction agent is delivered to the mixing region. It is thus ensured that the reduction agent conduit which lies in front of the mixing region in the flow direction is kept free of pressurized gas or pressurized air, so that one may securely prevent a crystallization of the reduction agent, in particular urea, in this region. The reduction agent only comes into contact with the pressurized gas behind the return valve in the flow direction, i.e. in the mixing region and from this further downstream to an injection nozzle for injecting the pressurized gas/reduction agent mixture into the exhaust gas flow. Since pressurized air is supplied to the mixing region in any case, this region in which the reduction agent may come into contact the pressurized gas, may always be automatically flushed through by the pressurized gas on cutting off the supply of the reduction agent, so that no residues of the reduction agent which may crystallize, may remain in this region.

The inventive arrangement of the return valve in the reduction agent conduit in front of the mixing region thus renders the additional flushing procedure on switching off the metering pump assembly superfluous. Furthermore, no additional valves are required in the metering pump assembly, in order to initiate such a flushing procedure. Thus, the construction as well as the operation of the metering pump assembly are considerably simplified and one achieves a large operational reliability.

The mixing of pressurized gas and reduction agent in the context of the invention is not only to be understood as a homogeneous mixing with which the reduction agent is finely distributed in the pressurized gas. Rather, the mixing may also be effected such that in each case larger quantities of the reduction agent are delivered by the pressurized gas, i.e. for example reduction agent drops, and pressurized gas are delivered in an alternating manner in the conduit, and the final homogenous mixing is not effected until when injecting into the exhaust gas flow.

The first return valve is particularly preferably arranged directly adjacent the mixing region, in which the reduction agent is mixed with the pressurized gas. This means that the supplied pressurized gas flows preferably through the complete region behind the return valve in the flow direction, so that on switching off the supply of reduction agent, this region may be completely flushed by the pressurized gas, and no reduction agent residues remain in this region. For this, the supply of pressurized gas to the mixing region is preferably designed such that the pressurized gas flows directly onto and over the outlet side of the return valve, wherein by way of closing the return valve, one prevents pressurized gas from being able to penetrate into the supply of reduction agent.

Particularly preferably, the first return valve is an integral constituent of a mixing chamber delimiting the mixing region. Thereby, the return valve preferably forms a part of a wall of the mixing chamber, into which the pressurized gas is introduced for mixing with the reduction agent. The return valve is thus integrated into the component defining the mixing chamber, so that it may be directly adjacent the mixing region.

For this, the mixing chamber preferably comprises an entry opening for the reduction agent, which is closed by the first return valve. Thus the closure element of the return valve preferably simultaneously forms a part of the inner wall of the mixing chamber. Pressurized gas introduced into the mixing chamber may thus flow over the exit side of the return valve, in order to be able to flush reduction agent located there, with the pressurized gas flow, out of the metering pump assembly via the injection nozzle into the exhaust gas flow.

The supply conduits of the reduction agent and of the pressurized gas to the mixing region are particularly preferably arranged concentrically to one another. For example, the reduction agent may be supplied through a central supply conduit and the pressurized gas flows through an annular channel surrounding the central supply conduit, into the mixing chamber. With such an arrangement, not only may one achieve a uniform mixing, but also one may blow the mixing chamber completely free of reduction agent, when the pressurized gas is led into the mixing chamber concentrically around the return valve. Preferably, the pressurized gas flows over the complete inner wall of the mixing chamber, so that reduction agent residue which sticks there may be flushed out.

The entry opening for the reduction agent is further preferably formed centrally in an end-side of the mixing chamber. For example, the mixing chamber may be designed in a cylindrical manner, and the entry opening for the reduction agent may be formed by an end-side or be arranged in an end-side of the mixing chamber. The cylindrical design of the mixing chamber is particularly advantageous with a concentric supply of the pressurized gas and reduction agent, since the pressurized gas may be led along the inner wall of the mixing chamber.

The mixing chamber preferably comprises a peripheral wall, in particular a cylindrical peripheral wall, in which entry openings for the pressurized gas are formed. Thereby, the entry openings are preferably arranged distributed over the whole periphery, preferably arranged distributed in a uniform manner, so that a uniform supply of the pressurized gas into all regions of the mixing chamber is ensured. By way of this, one succeeds in the complete mixing chamber being freed of reduction agent residues on switching of the supply of reduction agent.

The return valve may for example be designed such that an end-side of the preferably cylindrical mixing chamber is designed in a funnel-like manner, wherein a plate-like closure element of the first return valve is arranged in the funnel. An annular inflow of the reduction agent into the mixing chamber along the walls of the mixing chamber is achieved by way of this construction, so that a uniform mixing with the supplied pressurized gas may be ensured. Furthermore, the closure element with the surrounding wall in the closed condition forms a largely smooth inner wall, over which inflowing pressurized gas may flow in a uniform manner, in order to flush away reduction agent residues.

The first return valve in the reduction agent supply conduit preferably comprises a spring element which retains the return valve in a closed position, wherein the return valve may be moved into an opened position by the fluid pressure of the reduction agent against the force of the spring element. It is ensured by way of the spring biasing of the first return valve, that the return valve is always kept closed when no reduction agent is pumped to the mixing chamber by the metering pump, in order to prevent a penetration of the compressed gas into the reduction agent conduit or reduction agent supply conduit. The closure of the return valve is thus not effected or at least not solely effected by the pressure of the compressed gas, but by the spring element which biases the return valve into its closed position. Furthermore, by way of this arrangement, one may cause the return valve only to open at a predefined fluid pressure in the reduction agent supply conduit, by which means a defined supply of reduction agent to the mixing chamber may be ensured. The biasing in the context of a spring element may also be achieved by way of other suitable elastic elements.

According to a further preferred embodiment, the premixing device comprises a second return valve in a supply conduit for the pressurized gas. This return valve prevents reduction agent from getting into the pressurized air supply conduit on switching off the supply of pressurized air, or with a reduction of the pressure in the pressurized gas supply conduit. Preferably, this second return valve is also arranged directly on a mixing chamber or the mixing region in which the mixing of reduction agent and pressurized gas is effected. Thereby, the second return valve may also be an integral component of the premixing device or of the mixing chamber delimiting the mixing region. Furthermore, the second return valve is also biased such that it is kept closed in its idle position. This may be effected by spring elements or other elastic elements.

Preferably, the second return valve is formed by an elastic sealing element which may be brought to sealingly bear on a wall of the supply conduit for the pressurized gas. In the closed position, the elastic sealing element bears on the wall, so that no reduction agent or reduction-agent/pressurized-gas mixture may flow back into the pressurized gas supply conduit. In the opened condition, the sealing element lifts from the wall and releases the flow passage for the pressurized gas.

Thereby, the sealing element is sealingly held on the wall of the supply conduit, preferably by way of biasing, and may be moved by the pressure of the pressurized gas acting in the flow direction towards the mixing region, into an opened position distanced from the wall. It is ensured by way of this arrangement that the sealing element of the second return valve in the idle condition is always in the closed condition, so that no reduction agent may penetrate into the pressurized gas conduit. Only when the pressure of the pressurized gas has reached a value which exceeds the biasing force of the sealing element, does the sealing element open and the pressurized gas may then flow into the mixing region of the mixing chamber, wherein then it is ensured by way of the gas flow itself, that no reduction agent may flow back into the pressurized gas conduit.

Further preferably, the wall of the pressurized gas supply conduit is a preferably cylindrical outer wall of a component containing the mixing region and the first return valve. This component forms the mixing chamber. The sealing element of the second return valve may thereby be formed as an annular component which comes to bear with the outer wall, for example also a shoulder or a defined bearing region of the outer wall. Given an opened second return valve, the pressurized gas then flows over the outer wall of the component or of the mixing chamber, so that the pressurized gas may be supplied to the mixing chamber in an annular flow. The concentric supply of pressurized gas and reduction agent to the mixing chamber may be effected in this manner.

The sealing element of the second return valve is further preferably designed as an annular sleeve which extends in the flow direction of the pressurized gas inclined toward the wall. Thereby, the sleeve is formed of an elastic material, and is preferably designed such that the biasing of the elastic material retains the sleeve bearing on the wall. In the flow direction, the pressurized gas given an adequately high pressure may lift the sleeve from the wall, wherein this sleeve expands slightly, and the pressurized gas may flow along the wall to the mixing region. In the reverse direction however, the inclined geometry of the sleeve has the effect that the sleeve is pressed against the wall by the pressure and thus the return valve is closed, so that no reduction agent or agent-gas/reduction-agent gas mixture may flow back into the pressurized gas conduit.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
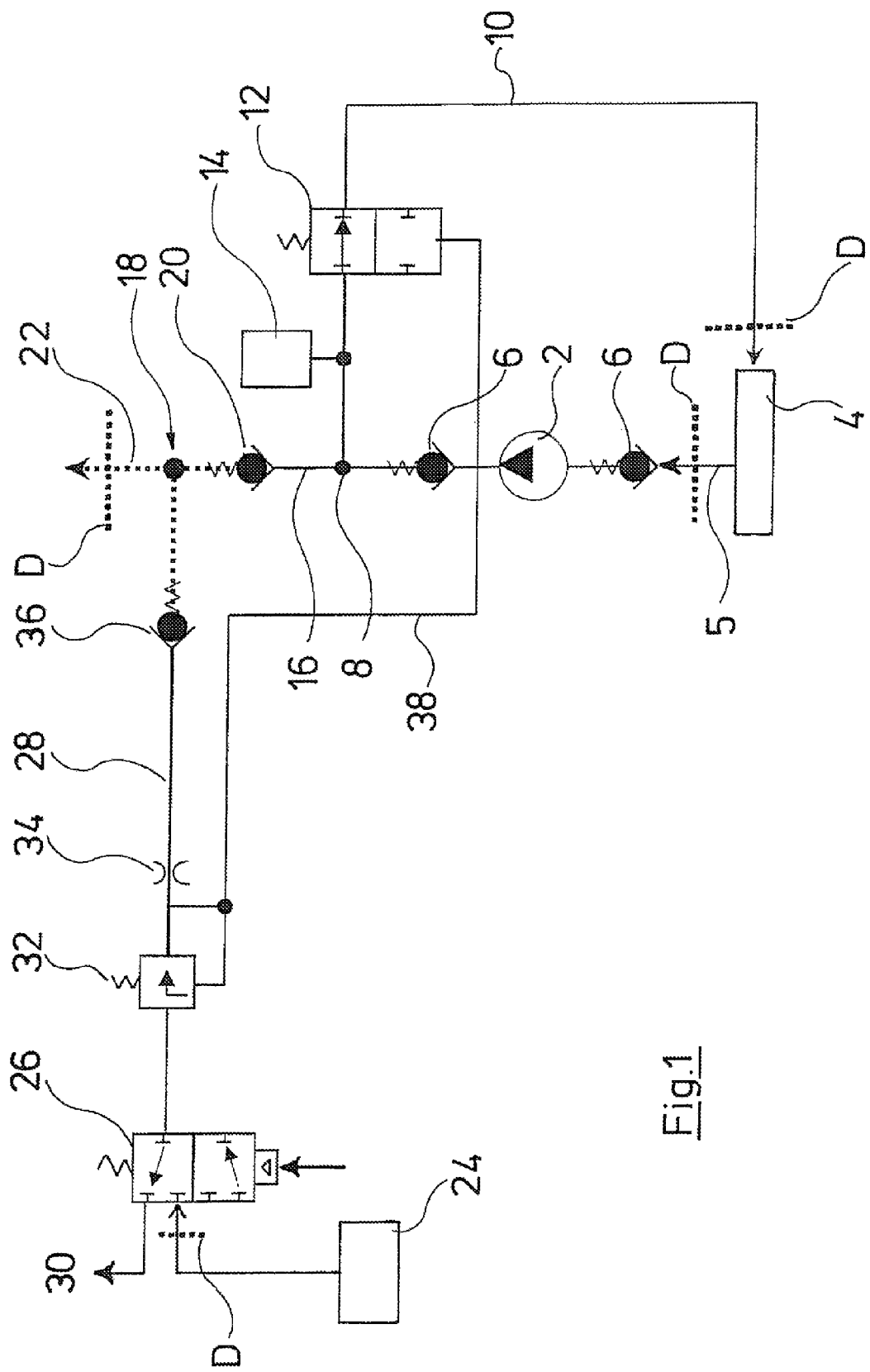
FIG. 1 is a circuit diagram of the hydraulic components of an metering pump assembly according to the invention.

Firstly, the basic function of one embodiment example of a metering pump assembly according to the invention is described by way of the circuit diagram in FIG. 1.

The main item of the metering pump assembly is a metering pump 2 which is designed as a membrane pump, with an associated drive. The quantity of the reduction agent delivered by the metering pump 2 may be set by way of the control of the pump, and in particular the control of the number of pump strokes, in order to be able to adapt the reduction agent quantity exactly to the demand on account of currently running combustion process in the motor. An aqueous urea solution is preferably used as a reduction agent. The reduction agent is kept ready in a reduction agent tank 4, out of which it is suctioned via a suction conduit 5 by the metering pump 2. In the known manner, in each case a return valve 6 is arranged in front of and behind the metering pump 2 in the shown example, and these valves are an essential constituent of the membrane pump. Thus the return valve 6 which is situated in front of the pump in the flow direction ensures that the reduction agent is not delivered back into the reduction agent tank 4 given a pump stroke. The return valve 6 which lies downstream of the metering pump 2 in the flow direction conversely ensures that with a suctioning, only reduction agent is suctioned out of the reduction agent tank 4, and is not suctioned back out of the pressure conduit.

A return conduit 10 branches at a branching point 8 downstream of the metering pump 2 and the second return valve 6, and leads back to the reduction agent tank 4 and serves for bleeding the system on starting operation of the metering pump 2.

An interruption- or shut-off valve 12 is arranged in the return conduit 10, by way of which the return conduit 10 may be closed, so that no reduction agent may flow back through the return conduit 10 to the reduction agent tank 4. In the idle condition shown, the shut-off valve 12 is located in the opened condition, in which the return conduit 10 is released. A pressure sensor 14 which detects the fluid pressure in front of the shut-off valve 12 and thus downstream of the metering pump 2 in the pressure conduit 16, is arranged in the return conduit 10 upstream of the shut-off valve 12 and downstream of the branching point 8.

The pressure conduit 16 leads from the metering pump 2 via the branching point 8 to the mixing region or the mixing chamber 18, to a device means in which the reduction agent is impinged or mixed with pressurized gas, in this case pressurized air. A return valve 20 which by way of biasing, for example a spring, is held in the shown idle position in a closed position and prevents a return flow of reduction agent, and in particular of pressurized gas from the mixing region 18 into the pressure conduit 16, is arranged directly in front of the mixing region 18 in the pressure conduit 16, i.e. at the end of the pressure conduit 16. A conduit 22 which leads to the injection nozzle in the exhaust gas system of the motor vehicle connects downstream of the mixing region 18 in the flow direction.

The pressurized air used in this example as pressurized gas is prepared by a pressurized air supply 24 of the motor vehicle. Such pressurized air supply systems are usually present in lorries, in particular for actuating the brakes. The shown metering pump assembly is connected to this central pressurized gas supply 24, wherein the metering pump assembly at the entry side comprises a solenoid or magnet valve 26 which selectively connects the pressured air conduit 28 which leads to the mixing region 18, to the pressurized air supply 24 or opens it to the atmosphere 30. The electrically actuated magnet valve 26 is biased such that it is held in its idle condition in the shown position, in which the pressurized air conduit 28 is open to the atmosphere 30.

In the pressurized air conduit 28, a pressure regulator 32 is arranged downstream of the magnet valve 26 in the flow direction, and a throttle 34 is arranged downstream of this pressure regulator.

The pressurized air conduit at the mixing chamber or the mixing region 18 ends in a return valve 36, which is biased such that it is closed in the shown idle condition and may be opened against its biasing by the pressure acting in the pressurized air conduit 28. It is thus ensured that the return valve 36 is always closed when no pressurized air flows out of the pressurized air conduit 28 into the mixing chamber 18, so that no reduction agent from the mixing region 18 may penetrate into the pressurized air conduit 28.

The shut-off valve 12 in the return conduit 10 is actuated by pressurized air and is connected to the pressurized air conduit 28 via an actuation conduit 38, wherein the actuation conduit 38 is in connection with the pressurized air conduit 28 between the pressure regulator 32 and the throttle 34. The actuation conduit 38 ensures that when the magnet valve 26 is switched over, so that the pressurized air conduit 28 is in connection with the pressured air supply 24, the actuation conduit 38 is also set under pressure. The air pressure prevailing in the actuation conduit 38 then effects a switch-over of the shut-off valve 12 against its biasing, so that the return conduit 10 is closed.

The previously described elements which lie within the boundary indicated in FIG. 1 by dashed lines D, i.e. in particular the metering pump 2, the shut-off valve 12, the magnet valve 26, the mixing point 18, the return valves and the conduits connecting these components, are all integrated in the metering pump assembly, so that the metering pump assembly, apart from the electrical connections, has only four fluid connections to the outside, specifically for connection to the pressurized air supply 24, for connection of the conduit 22 leading to the injection nozzle, for the connection of the suction conduit 5 leading to the reduction agent tank 4, and for connection of the return conduit 10 to the reduction agent tank 4.

On starting operation of the system, the magnet valve 26 firstly remains in its closed, idle condition (shown position), in which the pressurized air conduit 28 is separated from the compressed air supply 24. Firstly, the metering pump 2 is set into operation, which suctions reduction agent out of the reduction agent tank 4 via the suction conduit 5. The biasing of the return valve 20 in the shown, closed position, is selected such that the pressure in the pressure conduit 16 is not sufficient to open the return valve against the biasing, given an open return conduit 10.

Since no pressure prevails in the pressurized air conduit 28 at first, the actuation conduit 38 is also firstly without pressure, so that the shut-off valve 12 remains in its opened, idle position and the return conduit 10 is opened. In this manner, the metering pump 2 firstly delivers reduction agent from the reduction agent tank 4 and via the branching point 8 through the return conduit 10 back into the reduction agent tank 4. This serves for bleeding the system on starting operation, i.e. of firstly ensuring that the pressure conduit 16 is completely filled with reduction agent.

When the pressure conduit 16 and the return conduit 10 are completely filled with reduction agent, the fluid pressure in the pressure conduit 16 and in the return conduit 10 upstream of the shut-off valve 12 reaches a certain limit value, which is detected by the pressure sensor 14. When this limit value is detected by the pressure sensor 14, a control switches over the magnet valve 26, so that the pressurized air conduit 28 is supplied with pressurized air via the pressurized air supply 24 of the lorry. The actuation conduit 38 is also impinged with pressure by way of this, by which means the shut-off valve 12 is switched over against the spring biasing, and the return conduit 10 is closed in this manner. Since the pressure conduit 16 is no longer open to the reduction agent tank 4 via the return conduit 10, the fluid pressure on further operation of the metering pump 2 increases in the pressure conduit 16 to such an extent, that the pressure is enough to open the return valve 20 against its spring biasing, so that the reduction agent may flow into the mixing region 18 and there is impinged with pressurized air from the pressurized air conduit 28. Pressurized air and reduction agent then together flow through the conduit 22 to an injection nozzle in the exhaust gas conduit of the lorry.

The quantity of supplied reduction agent may be set on operation, via the number of pump strokes of the metering pump. The pressurized air flow through the pressurized air conduits 28 into the mixing region 18 is thereby constant.

If the installation is taken out of operation, in particular when turning the vehicle off, firstly the metering pump 2 is switched off, so that reduction agent is no longer delivered from the reduction agent tank 4. By way of this, the pressure in the pressure conduit 16 reduces to such an extent that the return valve 20 closes due to its biasing, and prevents further reduction agent from penetrating into the mixing region 18. Since the magnet valve 26 at first continues to be open, pressurized air continues to flow through the return valve 36 into the mixing region 18 and there flushes out the remainder of the reduction agent which is still present there, via the conduit 22.

When the magnet valve 26 is closed by switching off the supply of current, the pressurized air flow through the pressurized air conduit 28 and the return valve 36 is also cut off, so that the whole system is stopped in operation. In this condition, the shut-off valve 12 switches back into its idle condition again, i.e. the return conduit 10 is opened.

It is ensured by way of the arrangement of the return valve 20, that no air from the mixing chamber or the mixing region 18 may penetrate into the pressure conduit 16. Thus a crystallization of the reduction agent in the pressure conduit 16 may be prevented. Since furthermore, the mixing region 18 is automatically flushed on account of the constant pressurized air flow after switching off the metering pump 2, one may also prevent a crystallization of reduction agent in the mixing region 18 and in the conduit 22 which connects to this.

The pressure sensor 14 which preferably emits an electrical signal, apart from detecting the complete bleeding of the pressure conduit 16, also serves for recognizing further undesirable operating conditions. Thus a blocked return conduit 10 may be recognized by the pressure sensor 14, specifically when, given an opened shut-off valve 12, the pressure exceeds a predefined limit value which may normally not occur given an opened return conduit 10. Furthermore, the pressure sensor 14 may also detect that the injection nozzle in the exhaust gas conduit of the vehicle is blocked. Then specifically, the pressure in the pressure conduit 16 given an opened magnet valve 26 likewise increases beyond a predefined limit value, which may not normally occur when the injection nozzle is functioning in a correct manner. Furthermore, one may also detect that the reduction agent tank 4 is empty via the pressure sensor 14. Then, specifically on operation, the pressure in the pressure conduit 16 reduces below a predefined limit value which may not normally occur in normal operation given a closed return conduit 10.

Hereinafter, an exemplary construction of the premixing device consisting essentially of the mixing region 18 and the return valves 20 and 36 is described by way of FIGS. 2 to 5.

Figure 2:
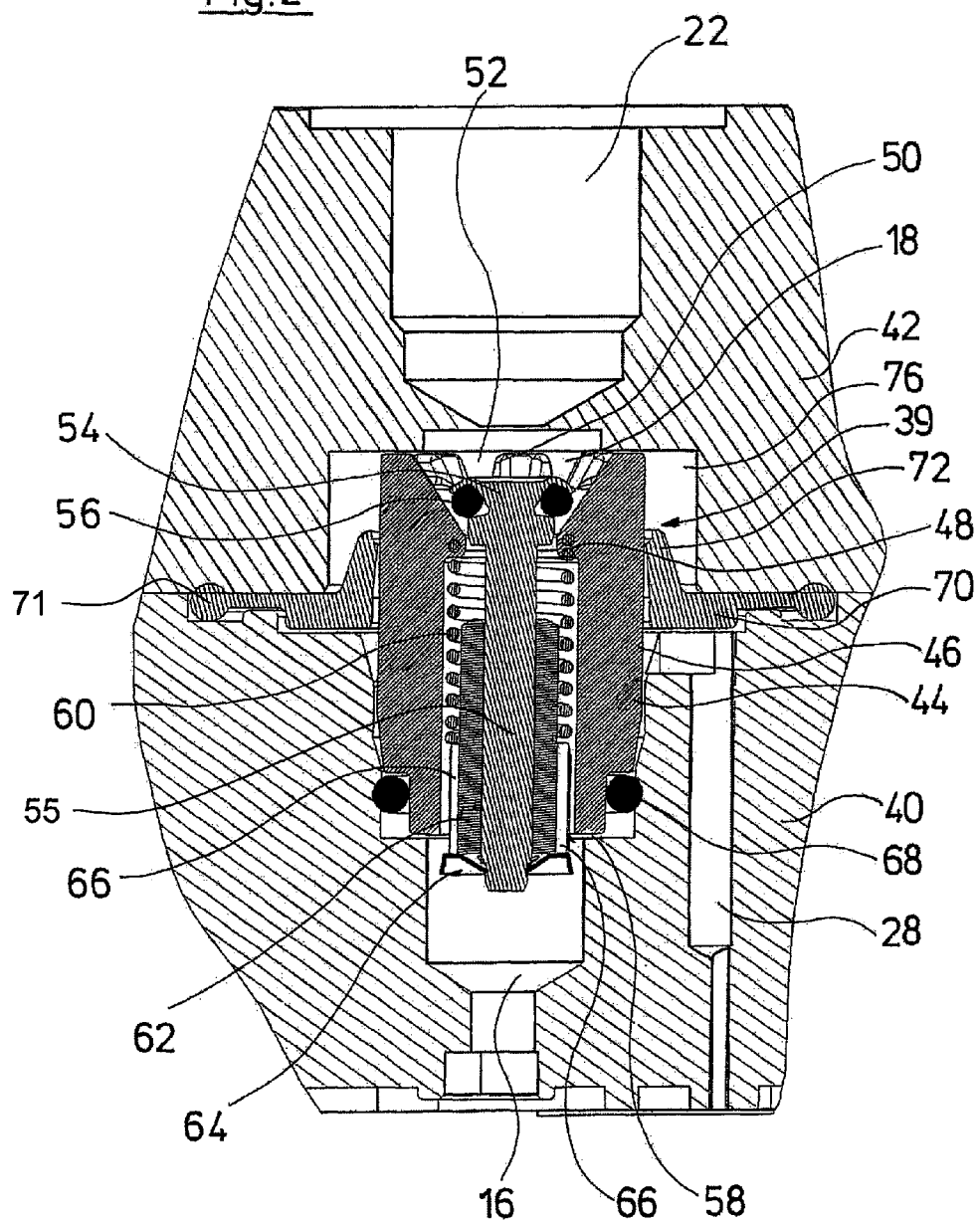
FIG. 2 is a sectioned cut-out, the premixing device of a metering pump assembly according to FIG. 1.

FIG. 2 shows a sectioned view of the premixing device 39 in a condition installed in a pump head. The pump head is formed essentially by a central plate 40 and an end-plate 42 which bears on this, wherein flow channels are formed, and the premixing device 39 arranged between the plates 40 and 42.

The conduit 22 in the end-plate 42 is designed as a connection, to which a fluid conduit which leads to an injection nozzle in the exhaust gas system of the vehicle, may be connected. The pressure conduit 16 as well as the pressurized air conduit 28 in the form of channels in the surface and through-holes connecting thereto, are formed in the central plate 40.

The premixing device furthermore, as a central component, comprises a cylindrical bush 44 with a cylindrical outer wall 46. A necking 48 is formed in the inside of the bush 44, and this necking divides the inner space of the bush 44 into two parts. The first part of the inner space, proceeding from the necking 48, widens in a funnel-like manner towards the first end-side 50 of the bush 44. This region is the actual mixing region 18 or the mixing chamber 18 of the premixing device 39. Recesses or openings 52 are formed in the peripheral wall of the mixing region 18 distributed uniformly over the periphery, and these serve as entry openings for the pressurized air. The opening surrounded by the necking 48, in the inside of the bush 44, serves as an entry opening for the reduction agent into the mixing region 18. This region is closed by a piston 54 with an O-ring 56 applied into a peripheral groove. Thereby, the O-ring 56, as shown in the FIGS. 3 and 4, may come to bear on the funnel-like inner wall of this mixing region 19 in the inside of the bush 44, in a sealing manner.

The piston 54 extends with a piston rod 55 through the necking 48 into the second region in the inside of the bush 44, to the second end-side 58 which is distant to the first end-side 50. A compression spring which is supported with a first end on the necking 46, is arranged in the second part of the inner space of the bush 44. The opposite end of the compression spring 60 which is designed as a helical spring, bears on a guide bush 62 surrounding the piston rod 55, on a shoulder facing the necking 48. The guide bush 62 guides the piston rod and thus the piston 54 in the inside of the bush 44, in that it bears on the inner wall of the bush 44. The guide bush 62 is supported via a spring ring 64 on the longitudinal end of the piston rod 55 which is distant to the piston 54. Thus the compression spring 60 presses the piston rod 55 in the direction of the second end-side 58 of the bush 40, so that the piston 54 with the O-ring 56 is pressed against the funnel-like or conical inner wall of the mixing region 18. In this manner, the piston 54 which forms the return valve 20 in FIG. 1, is held in its idle position in the closed condition, as is shown in the FIGS. 3 and 4.

The guide bush 62 on its outer periphery comprises longitudinal grooves 66 (not shown in the FIGS. 3 to 5), by way of which reduction agent may flow through the pressure conduit 16 into the inside of the bush 44 to the necking 48. One prevents the reduction agent from being able to flow past the bush 44 at the outside, by way of the O-ring 68 surrounding the bush 44 at the outside. In the inserted condition, the O-ring 68 seals the outer wall of the bush 44 to the inner wall of a recess, in which the bush 44 is arranged in the central plate 40.

The fluid pressure in the pressure conduit 16 in the inside of the bush 44 acts on the piston 54 in the direction of the longitudinal axis of the piston rod 55. With an adequately high fluid pressure in the pressure conduit 16, the force acting due to the pressure on the piston 54 exceeds the spring force of the compression spring 60, so that the piston 54 with the piston rod 55 is displaced in the direction of the first end-side 50 of the bush 44, and the piston 54 with the O-ring 56 lifts from the conical inner wall of the mixing region 18, as shown in the FIGS. 2 and 5. Thus, an annular gap between the piston 54 or the O-ring 56 and the surrounding inner wall of the bush 44 or of the mixing region 18 arises, through which the reduction agent may flow into the mixing region 18.

The second return valve 36 of the premixing device 39 is formed by an annular elastic collar 70 which is clamped between the central plate 40 and the end-plate 42. Thereby, in particular a thickened region 71 on the outer periphery of the collar 70 comes to bear on the central plate 40 as well as the end-plate 42, so that the compressed air from the pressurized air conduit 28 may not flow past the outer periphery of the collar 70.

Figure 3:
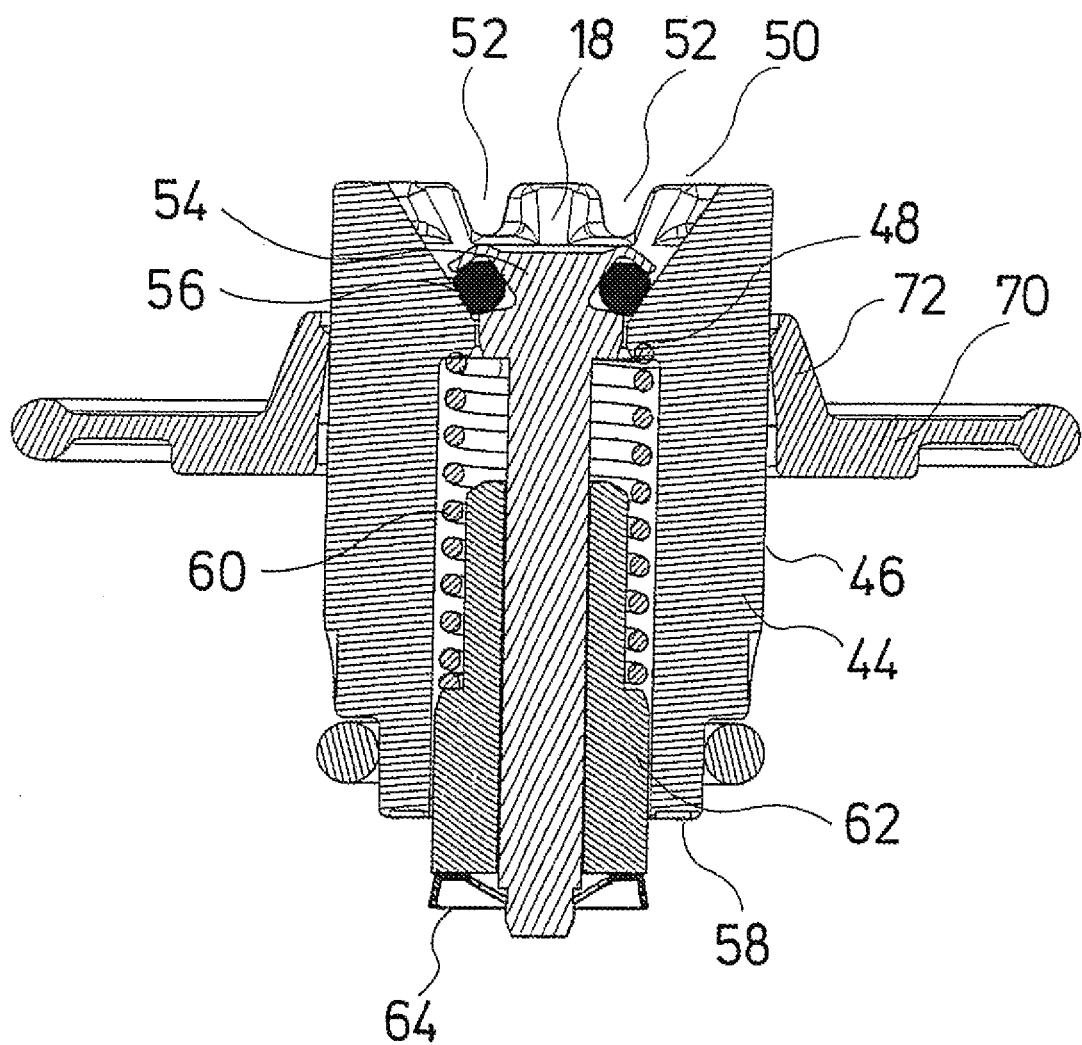
FIG. 3 is a separate sectioned view, the premixing device according to FIG. 2 with closed return valves.
Figure 4:
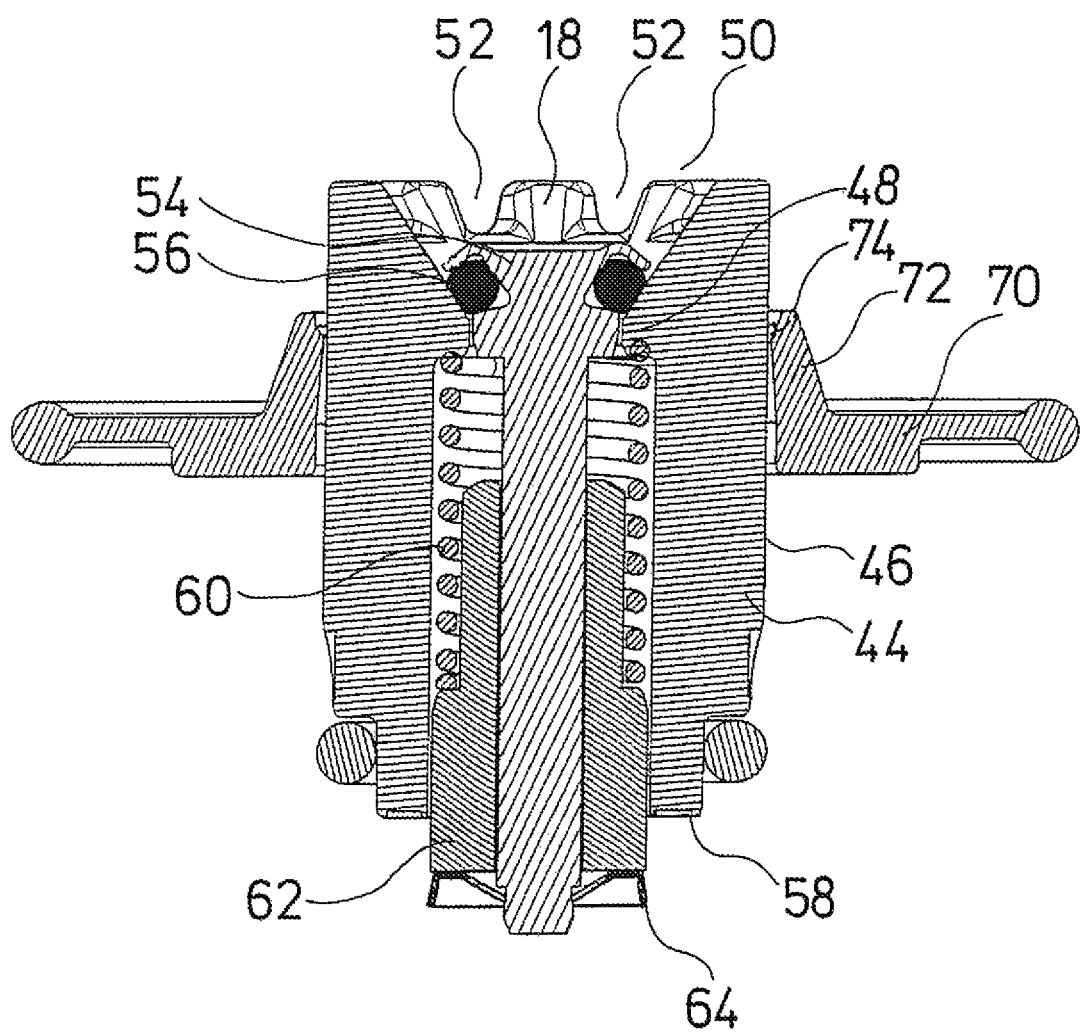
FIG. 4 shows the premixing device according to FIG. 3, with an opened return valve for the pressurized gas supply.
Figure 5:
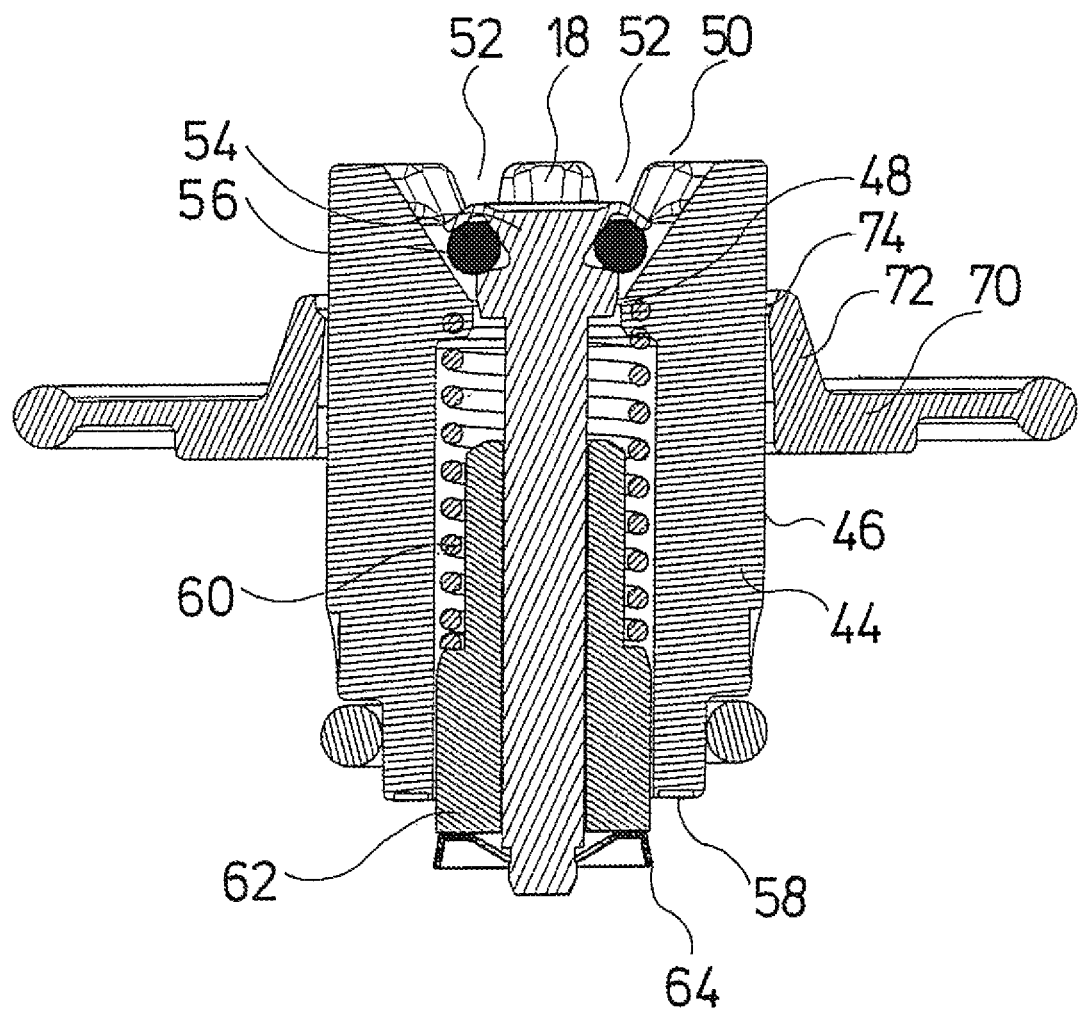
FIG. 5 is the premixing device according to FIGS. 3 and 4 with an opened return valve for the reduction agent supply, and an opened return valve for the pressurized gas supply.

The collar 70 on its inner periphery is extended in a bush-like manner in the axial direction towards the end-side 50 of the bush 44, so that a sleeve 72 is formed. This sleeve 72 extends in a slightly conically inclined manner to the outer wall 46 of the bush 44, and comes to bear on this with its free terminal end. Thereby, the sleeve 72 or the collar 70 are formed in an elastic manner, such that the collar 70 in its idle position is sealingly held on the outer wall 46 of the bush 44 as is shown in FIGS. 2 and 3.

If pressurized air is introduced into the pressurized air conduit 28, the pressurized air in the central plate 40 firstly at the outer periphery 46 flows around the complete bush 44, since the recess accommodating the bush 44, in the central plate 40, is formed larger in the region distant to the pressure conduit 16 than the outer diameter of the bush 44. The compressed air then flows into the region between the collar 72 of the sleeve 70, and the outer wall 46 of the bush 44, wherein the collar is pressed away from the outer wall of the bush 46 by the air pressure, so that an annular gap 74 arises between the outer wall 46 and the inner periphery of the sleeve 70 or of the collar 72, through which the compressed air may flow into the recess 76 in which the bush 44 is arranged in the end-plate 42. The pressurized air then flows from the recess 46 through the recesses or openings 52 into the mixing region 18 and from there, together with the supplied reduction agent, through the conduit or the connection 22 further to the injection nozzle in the exhaust gas system.

When the supply of pressurized gas in the pressurized gas conduit 28 is switched off, the sleeve 72 with its collar 70 on account of its elasticity again sealingly bears on the outer wall 46 of the bush 44. On account of the sleeve 72 of the collar 70 projecting into the recess 76, one further succeeds in a greater pressure in the recess 76 pressing the bush-like extension or the sleeve 72 of the collar 70 even more strongly against the outer wall 46, and thus securely closing the return valve 36.

The recesses or openings 52 are designed such that they extend in the longitudinal direction of the bush 44 up to the outer side of the piston 54. Furthermore, recesses 52 are shaped such that they widen towards the inside of the bush 44, i.e. towards the mixing region 18. By way of this, one succeeds in pressurized air which flows through the recesses 52 into the mixing region 18, completely flowing over the whole mixing region 18 at its inner wall and in particular also the outer side of the piston 54, so that reduction agent residues may be completely flushed out of the mixing region 18.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A metering pump assembly for admixing a fluid reduction agent into an exhaust gas flow, comprising:
   a premixing device that includes:
   a mixing chamber having:
   a peripheral wall in which entry openings for pressurized gas are formed,
   a mixing region in which the supplied reduction agent is mixed with the pressurized gas, and
   an entry opening for the reduction agent, formed centrally in an end-side of the mixing chamber,
   a first check valve arranged in the premixing device in a supply conduit for the reduction agent, in front of and directly adjacent the mixing region in the flow direction, and wherein the entry opening of the reduction agent is closed by the first check valve, and
   wherein the entry openings for the pressurized gas are configured to supply a flow of the pressurized gas onto and over an outlet side of the first check valve.

2. A metering pump assembly according to claim 1, wherein the first check valve is an integral component of the mixing chamber delimiting the mixing region.

3. A metering pump assembly according to claim 1, further comprising a supply conduit for the pressurized gas that includes a second return valve upstream from a first return valve in the flow direction of the pressurized gas.

4. A metering pump assembly according to claim 3, wherein the supply conduits of the reduction agent and of the pressurized gas to the mixing region are arranged concentrically to one another.

5. A metering pump assembly according to claim 4, wherein an end-side of the mixing chamber is designed in a funnel-like manner, wherein a plate-like closure element of the first check valve is arranged in a funnel.

6. A metering pump assembly according to claim 4, wherein a first return valve is held in a closed position by a spring element, and may be moved into an opened position by way of the fluid pressure of the reduction agent against the force of the spring element.

7. A metering pump assembly according to claim 3, wherein a second check valve is formed by an elastic sealing element, which may be brought to sealingly bear on a wall of the supply conduit.

8. A metering pump assembly according to claim 7, wherein the sealing element is sealingly held on the wall of the supply conduit by way of biasing, and may be moved into an opened position distanced to the wall by way of the pressure of the pressurized gas acting in the flow direction towards the mixing region, against the biasing.

9. A metering pump assembly according to claim 7, wherein the wall is a generally cylindrical, outer wall of a component containing the mixing region and the first check valve.

10. A metering pump assembly according to claim 9, wherein the sealing element of the second check valve is designed as an annular sleeve which extends in the flow direction of the pressurized gas inclined towards the wall.

11. A metering pump assembly according to claim 7, wherein the second check includes a collar having a sleeve about an inner periphery of the collar that extends in the axial direction.

12. A metering pump assembly according to claim 11, wherein the sleeve extends conically from the collar.

13. A metering pump assembly according to claim 7, wherein the second check valve circumscribes the wall of the supply conduit.

14. A metering pump assembly for admixing a fluid reduction agent into an exhaust gas flow, comprising:
a premixing device that includes:
a mixing chamber having:
a peripheral wall in which entry openings are formed to direct a flow of pressurized gas radially inwardly onto and over an outlet side of a first check valve within the mixing chamber, and
a mixing region in which the supplied reduction agent is mixed with the pressurized gas, and
an entry opening for the reduction agent, formed centrally in an end-side of the mixing chamber,
wherein the first check valve is arranged in the premixing device in a supply conduit for the reduction agent, in front of and directly adjacent the mixing region in the flow direction, and wherein the entry opening of the reduction agent is closed by the first check valve, and
a supply conduit for the pressurized gas that includes a second check valve upstream from the first check valve in the flow direction of the pressurized gas and wherein the supply conduit is configured to supply the flow of the pressurized gas through the entry openings of the peripheral wall of the mixing chamber onto and over an outlet side of the first check valve.

15. A metering pump assembly for admixing a fluid reduction agent into an exhaust gas flow, comprising:
a central plate;
an end-plate having a surface; and
a premixing device positioned between the central plate and the end-plate, the premixing device including:
a mixing chamber having:
a mixing region in which the supplied reduction agent is mixed with a pressurized gas,
a peripheral wall in which entry openings for the pressurized gas are formed, the peripheral wall being adjacent the surface of the end-plate to direct a flow of the pressurized gas radially inwardly onto and over an outlet side of a first check valve, and
an entry opening for the reduction agent, formed centrally in an end-side of the mixing chamber,
wherein the first check valve is arranged in the premixing device in a supply conduit for the reduction agent, in front of and directly adjacent the mixing region in the flow direction, and wherein the entry opening of the reduction agent is closed by the first check valve, and
a supply conduit for the pressurized gas that includes a second return valve upstream from a first return valve in the flow direction of the pressurized gas and wherein the supply conduit is configured to supply a flow of the pressurized gas to the entry openings of the peripheral wall.

* * * * *